US009598143B1

(12) United States Patent
Nahas (10) Patent No.: US 9,598,143 B1
(45) Date of Patent: Mar. 21, 2017

(54) HYBRID HYDRAULIC-OPERATED BICYCLE

(71) Applicant: Imad Nahas, Lancaster, CA (US)

(72) Inventor: Imad Nahas, Lancaster, CA (US)

( * ) Notice: Subject to any disclaimer, the term of this patent is extended or adjusted under 35 U.S.C. 154(b) by 0 days.

(21) Appl. No.: 14/822,283

(22) Filed: Aug. 10, 2015

Related U.S. Application Data (60) Provisional application No. 62/041,308, filed on Aug. 25, 2014.

(51) Int. Cl.
*B62M 19/00* (2006.01)
*F15B 13/042* (2006.01)
*B62K 3/04* (2006.01)

(52) U.S. Cl.
CPC ............... *B62M 19/00* (2013.01); *B62K 3/04* (2013.01); *F15B 13/042* (2013.01); *F15B 2211/2053* (2013.01)

(58) Field of Classification Search
CPC ........ B62K 3/04; B62M 19/00; F15B 13/042; F15B 2211/2053; F15B 2211/20576; F15B 2211/20569
USPC ....................................................... 280/216
See application file for complete search history.

(56) References Cited

U.S. PATENT DOCUMENTS

| | | | |
|---|---|---|---|
| 2,177,381 A * | 10/1939 | Bichi | B62M 1/105 280/216 |
| 4,087,105 A | 5/1978 | Amarantos | |
| 4,290,621 A | 9/1981 | Davey | |
| 4,354,797 A * | 10/1982 | Hirose | E02F 3/437 414/700 |
| 4,688,815 A | 8/1987 | Smith | |
| 5,634,653 A | 6/1997 | Browning | |
| 2013/0008246 A1 | 1/2013 | Nelson et al. | |

FOREIGN PATENT DOCUMENTS

| | | | | |
|---|---|---|---|---|
| DE | 19741941 A1 * | 5/1999 | | B62M 19/00 |
| EP | 0528923 B1 | 8/1994 | | |
| EP | 2520483 A1 | 11/2012 | | |

* cited by examiner

*Primary Examiner* — Kevin Hurley
*Assistant Examiner* — Felicia L Brittman
(74) *Attorney, Agent, or Firm* — Robert C. Montgomery; Montgomery Patent & Dess LP.

(57) ABSTRACT

A hydraulically-powered bicycle having a frame, handle bars, a front tire, and a hydraulically powered drive wheel. The drive wheel is powered by oil from a sump which is pressurized by a pair of foot-operated pumps. An accumulator selectively stores and releases energy stored in a spring under the control of a control valve. When released the stored energy provides an energy boost to the bicycle. The pumps are dual piston devices that selectively couple a second piston to a first piston. The pumps implement a power control using the dual pistons. Coupling the pistons together is performed by a linkage assembly having linkage arms and linkage pivots.

18 Claims, 9 Drawing Sheets

HYBRID HYDRAULIC-OPERATED BICYCLE

RELATED APPLICATIONS

This application claims the benefit of U.S. Provisional Application No. 62/041,308, which was filed Aug. 25, 2014, the entire disclosures of which are incorporated herein by reference.

FIELD OF THE INVENTION

The present invention relates generally to bicycles. More particularly it relates to a multiple speed bicycle having a hydraulic drive system with stored energy assist.

BACKGROUND OF THE INVENTION

Modern concerns about health and physical fitness have produced an abundance of people who almost religiously participate in a wide variety of exercise activities to stay in shape. One (1) of the most popular exercise activities is bicycling. The muscular and cardiovascular workout associated with bicycling makes it an effective means by which to stay fit as well as an ecologically friendly, low cost and fun way to get from one (1) place to another.

While bicycle technology has changed much over the years, one basic aspect which has remained relatively static is the chain and sprocket drive system used to transfer mechanical energy from the rider to the bicycle wheel. Such chain and sprocket drive systems are noisy, prone to failure, and potentially dangerous should an article of clothing or an extremity become caught in the chain.

Accordingly, there exists a need for an alternative bicycle drive system which addresses the foregoing deficiencies. Preferably such an alternative bicycle drive system would retain the health and recreational benefits of bicycling while providing a clean, quiet and safe propulsion system.

SUMMARY OF THE INVENTION

The principles of the present invention provide for a hydraulically-powered bicycle drive system which retains the health and recreational benefits of prior art bicycling while providing clean, quiet and safe propulsion.

In one (1) aspect the present invention takes the form of a hydraulically-powered bicycle having a frame, handle bars, a front tire, and a hydraulically-powered drive wheel. Also included are a hydraulic motor for driving the drive wheel, a hydraulic sump for retaining oil, and a hydraulic control valve having at least a first operational position, a second operational position, and a third operational position. The hydraulically-powered bicycle also includes a first hydraulic pump operated by a first pedal and which is operatively connected to the sump and to the control valve. The first hydraulic pump is for pressurizing oil received from the sump. There is also a second hydraulic pump operated by a second pedal and which is operatively connected to the sump and to the control valve. The second hydraulic pump is also for pressurizing oil received from the sump. Also included is the necessary piping for directing pressurized oil from the control valve when the control valve is in the first operational position into the hydraulic motor.

In practice the piping also directs oil from the hydraulic motor back into the sump. The oil directed back into the sump beneficial passes through the control valve as it flows into the sump. The control valve will usually include an internal valve spool that directs the flow of oil within the control valve.

Beneficially, the hydraulically-powered bicycle according also includes an accumulator for receiving and storing pressurized oil when the control valve is in the second operational position. The accumulator may be comprised of a rigid vessel having an accumulator input port and a spring-biased diaphragm which divides the accumulator into an expandable compartment and a fill space. Then, oil directed into the accumulator pushes the diaphragm against the spring which causes the expandable compartment to expand and to store energy in the compressed spring. The control valve continues to direct oil flow toward the motor when in the second operational position. Energy stored in the compressed spring is released when the control valve is moved to the third operational position. The compressed spring causes oil in the expandable compartment to pass through the control valve and toward the hydraulic motor. Energy stored in the compressed spring increases the power output of the hydraulic motor.

The first pump maybe a dual piston pump having a two-part housing. In that case the first pump will have a first piston and a second piston as well as the two-part housing. The first pump is beneficially configured to selectively use the second piston along with the first piston. Selective use can be performed by a lock-linkage that selectively connects the second piston to the first piston. That lock-linkage can include linkage arms interconnected at pivots.

In another aspect the present invention takes the form of a hydraulically-powered bicycle having a frame, handle bars, a front tire, and a hydraulically-powered drive wheel which is driven by a hydraulic motor. Also included is a hydraulic sump for retaining oil, a hydraulic control valve having at least a first operational position, a second operational position, and a third operational position. Also included is a first hydraulic pump operated by a first pedal and operatively connected to the sump and to the control valve for pressurizing oil received from the sump. The first hydraulic pump includes a first piston, a second piston, a two-part housing and a lock-linkage for selectively operatively connecting the first piston to the second piston. The hydraulically-powered bicycle also has a second hydraulic pump that is operated by a second pedal and which is operatively connected to the sump and to the control valve. The second hydraulic pump for also for pressurizing oil received from the sump. Piping directs pressurized oil from the control valve when the control valve is in the first operational position into the hydraulic motor.

In practice the lock-linkage includes linkage arms that are interconnected by pivots. The hydraulically-powered bicycle further includes an accumulator for receiving and storing pressurized oil. The accumulator is comprised of a rigid vessel having an accumulator input port and a spring-biased diaphragm which divides the accumulator into an expandable compartment and a fill space.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

DESCRIPTIVE KEY 10 hydraulic-powered bicycle
22 frame
24 front wheel
26 drive wheel
27 handle bar
28 lower beam
30a first pedal
30b second pedal
32 pedal arm
34 pedal arm pivot
36 pump actuation link
38 footpad
40 pedal return link
42 pedal return pivot
44a first finger
44b second finger
50a first pump
50b second pump
51 housing
52 fixed pump segment
54 base
56 fixed wall
58 chamber wall
60 first piston chamber
62 first inflow check valve
64 first outflow check valve
66 second inflow check valve
68 second outflow check valve
72 first piston
74 first piston seal
78 rod
80 second piston chamber
82 second piston
84 second piston aperture
86 second piston seal
88 rod seal
90 moveable pump segment
92 top plate
94 cable aperture
96 moveable wall
98 wall seal
100 third chamber
102 void
110 lock linkage
112 end pivot
114 linkage arm
118 linkage pivot
122 piston pivot
124 slide ring
126 cable pivot
130 cable gathering system
132 shift cable
134 lock lever
136 lock lever pivot
150 control valve
152 valve spool
154a first operational position
154b second operational position
154c third operational position
156 vent
160 motor
162 motor inlet port
164 motor outlet port
170 accumulator
172 vessel
174 diaphragm
176 spring
178 compartment
182 space
184 accumulator input port
190 sump
194 piping
200 oil

DETAILED DESCRIPTION OF THE PREFERRED EMBODIMENT

The preferred embodiment of the present invention is depicted within FIGS. 1-5d. However, the invention is not limited to what is specifically illustrated and described. A person skilled in the art will appreciate that many other embodiments of the invention are possible without deviating from the basic concept of the invention. Any such work around also falls with the scope of this invention.

The terms "a" and "an" herein do not denote a limitation of quantity, but rather denote the presence of at least one of the referenced items. In addition, unless otherwise denoted all directional signals such as up, down, left, right, inside, outside are taken relative to the illustration shown in FIG. 1.

Figure 1:
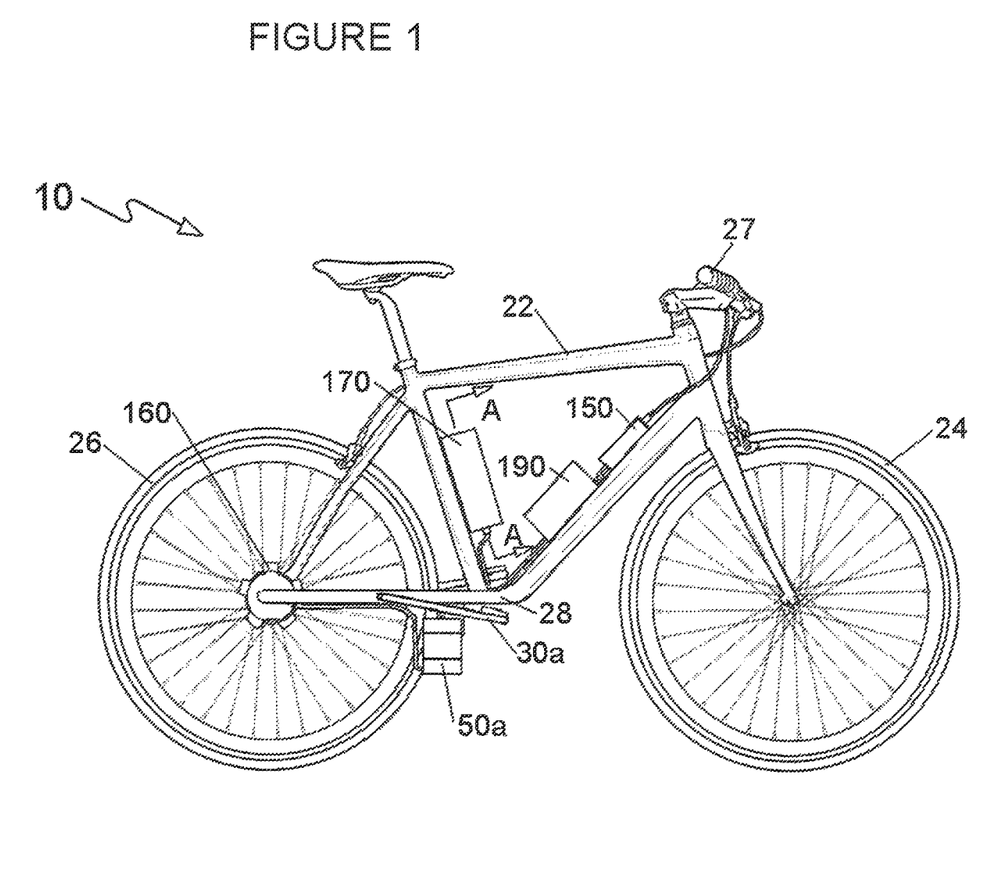
FIG. 1 is an elevation view of a hydraulically-powered bicycle 10 that is in accord with the preferred embodiment of the present invention.

Refer now to FIG. 1 for an elevation view of the present invention, which is a two-speed hydraulically-powered bicycle 10 having a hydraulic drive system and advanced pumps. The hydraulically-powered bicycle 10 includes a hydraulic accumulator 170 that selectively stores and releases hydraulic energy through a hydraulic drive motor 160 to provide a power assist such as when climbing a hill. The hydraulically-powered bicycle 10 uses a long molecular chain, hydrocarbon-based, non-compressible Newtonian fluid for power transmission. That fluid is referred to hereafter as oil 200 (see FIG. 2).

Figure 2:
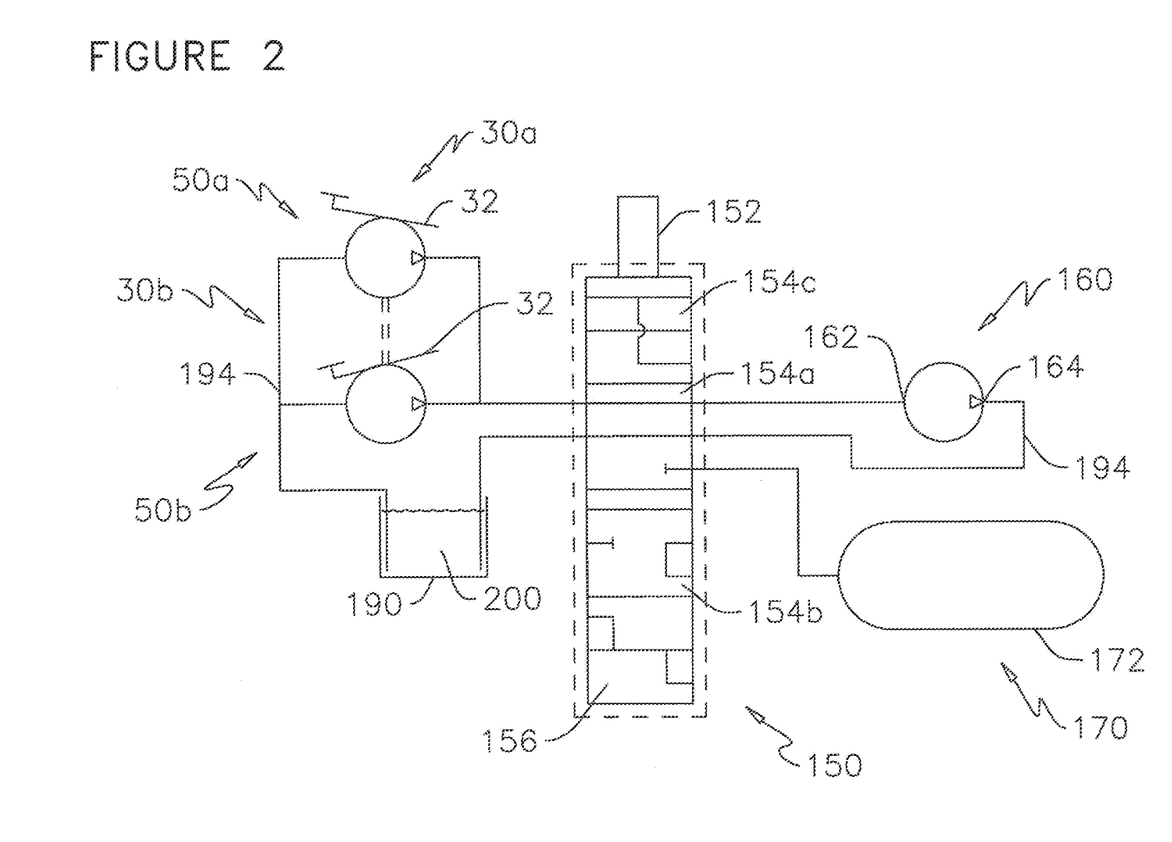
FIG. 2 is a schematic of the drive of the hydraulically-powered bicycle 10 shown in FIG. 1.

Refer now to both FIG. 1 and to FIG. 2, which is a hydraulic schematic of the hydraulically powered bicycle 10. The hydraulically-powered bicycle 10 includes some of the components of a prior art bicycle, including a frame 22, handle bars 27, a front wheel 24 having a front tire, and a rear tire. However, the rear tire is mounted on a hydraulically powered drive wheel 26. The prior art bicycle components are modified as necessary to incorporate the hydraulic drive system described in more detail subsequently. For example, the frame 22 has a cross-through design.

The hydraulically-powered bicycle 10 also includes components not found in the prior art. Those components include a first pump 50a that is operated by a first pedal 30a, a second pump 50b that is operated by a second pedal 30b (see FIGS. 2 and 3), a multi-positional control valve 150, the hydraulic motor 160, a sump 190, and the accumulator 170. Also included on the frame 22 are various hoses and tubes, hereinafter called piping 194, which moves oil 200 and transfers pressure from one (1) component to another.

Figure 3:
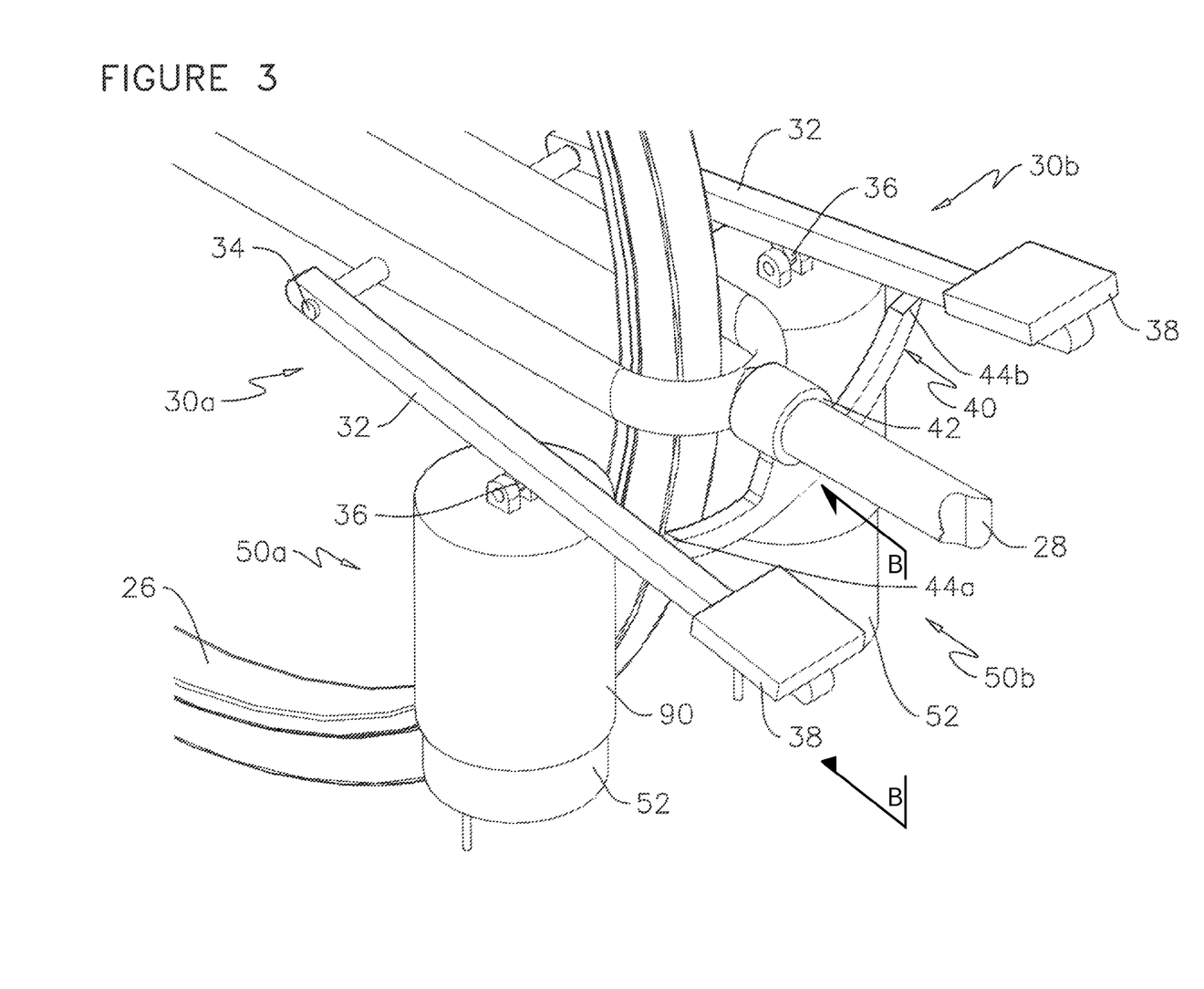
FIG. 3 is an isolated view of a first pedal 30a and a second pedal 30b used in the hydraulically powered bicycle 10 of FIG. 1.

Referring now also to FIG. 3, the foot pedals 30a, 30b are used to compress oil 200 drawn from the sump 190 by the operations of the first pump 50a and second pump 50b. The sump 190 is an oil reservoir held at or near atmospheric pressure. Oil 200 is drawn into the pumps 50a, 50b for use in propulsion as is explained in more detail subsequently and then exhausted back into the sump 190. When the control valve 150 is in a first operational position 154a pumped oil 200 is directed through the motor 160. This results in rotation of an output shaft (not shown) which drives the drive wheel 26.

The preferred motor 160 is an INTERMOT IAM H Series® radial piston motor or a similar motor. Thus the motor is well known and available in the prior art. In operation when a valve spool 152 in the control valve 150 is in operational position 154a the motor 160 receives pressurized oil 200 in a first cylindrical cavity via a motor inlet port 162. This causes displacement of a motor piston within the first cylindrical cavity at a rate dependent on the oil 200 flow rate. Displacement of the motor piston results in rotation of the motor shaft. When the first motor piston reaches the bottom of its stroke a valve within the motor 160 causes oil 200 to enter the next sequential cavity. Oil 200 then causes displacement of a second motor piston which in turn causes further rotation of the motor shaft. This procedure continues until the oil 200 input flow stops. Oil flow can be stopped either by the user stopping peddling or by displacement of the valve spool 152 in the control valve 150 to one of the other operational positions 154b-154c.

When either the first motor piston or the second motor piston reaches the bottom of its stroke a valve inside the motor 160 enables oil 200 to leave the cavity it is in and to pass through a motor outlet port 164. Expended oil 200 then passes through the control valve 150 along a path dictated by the porting of the valve spool 152 and back into the sump 190. This continues until the motor 160 stops rotating. When the valve spool 152 is in operational position 154a the accumulator 170 is blocked and oil 200 cannot enter or exit the accumulator 170.

Figure 4A:
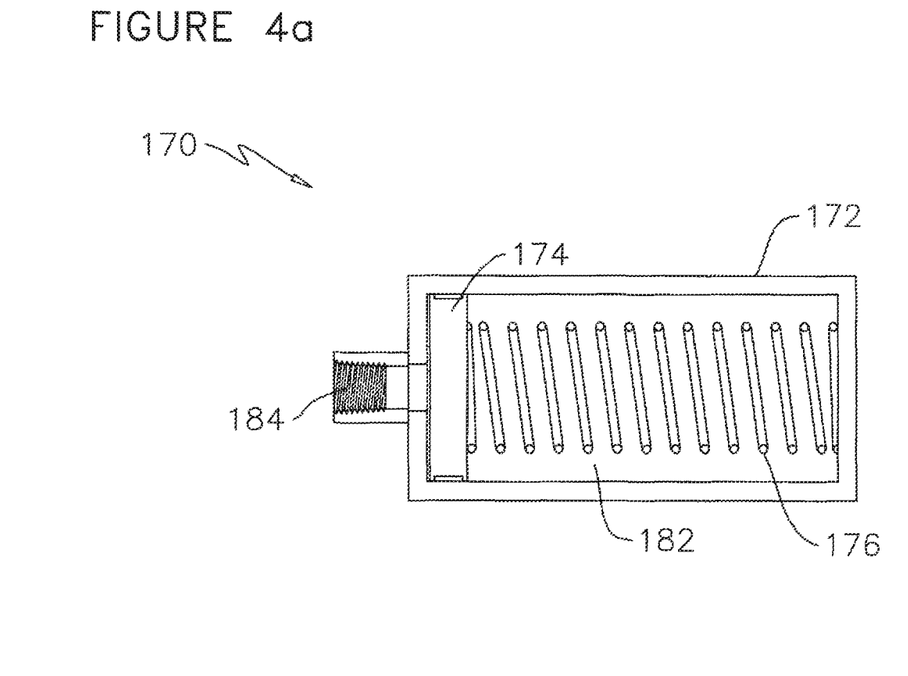
FIG. 4a is a cross-sectional view taken along section line A-A of FIG. 1 showing an empty accumulator 170.
Figure 4B:
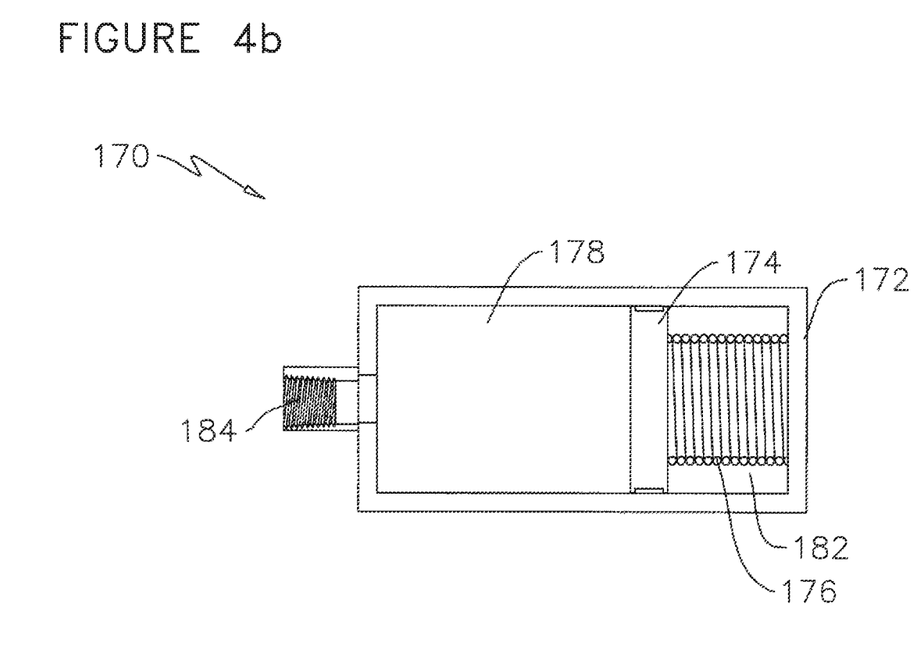
FIG. 4b is cross-sectional view of a fully charged accumulator 170.

In a second operational position 154b of the control valve 150 the valve spool 152 also directs oil 200 from the first pump 50a and from the second pump 50b into the motor 160 to cause that motor to rotate as previously described. However, the control valve 150 also directs oil 200 into the accumulator 170. Referring now to FIGS. 4a and 4b, the accumulator 170 is comprised of a rigid vessel 172 having an accumulator input port 184 and a spring 176 biased diaphragm 174. The diaphragm 174 divides the accumulator 170 into a sealed, expandable compartment 178 on the input side and a fill space 182 on the other side. Oil 200 directed into the compartment 178 pushes the diaphragm 174 against the spring 176. This causes expansion of the compartment 178, a corresponding reduction in the volume of the fill space 182, and energy to be stored in the compressed spring 176 (see FIG. 4b). The oil 200 continues flowing into the accumulator 170 until the oil pressure in the accumulator 170 rises to that produced at the pedals 30a, 30b plus inertial energy from the motor 160. Motor 160 drive of the drive wheel 26 stops when the difference in oil 200 pressure across the motor 160 produces no torque. This produces regenerative braking since the drive wheel 26 is slowed by the storage of potential energy in the spring 176. In practice a user can switch the valve spool 152 between the first operational position 154a and the second operational position 154b to partially charge the accumulator 170.

The stored energy in the spring 176 can be used when additional power is needed, such as when going uphill. To use the stored energy the valve spool 152 is moved to a third operational position 154c. In operational position 154c oil 200 from the first pump 50a and from the second pump 50b is again directed into the motor 160 via the motor inlet port 162. This causes the motor 160 to rotate as previously described. In addition, oil flow and oil pressure from the accumulator 170 is directed into the motor 160. Since the output speed of the motor 160 is directly proportional to the oil flow rate through the motor 160 and since the output torque is directly proportional to the pressure across the motor inlet port 162 and the motor outlet port 164, the additional oil 200 from the accumulator 170 increases the output of the motor 160. While not all stored energy in the accumulator 170 can be recovered since the accumulator 170 traps some of the oil 200 the stored energy that is recovered can be highly beneficial.

As shown in FIG. 2 the hydraulically-powered bicycle 10 can includes a vent 156 in the valve spool 152. The vent 156 can be used to depressurize the system. Not all hydraulically-powered bicycles 10 may include a vent 156. Furthermore, other fluid conditioning and monitoring equipment such as, but not limited to, heat exchangers and filters may be incorporated into the hydraulically-powered bicycle 10.

The valve spool 152 is moved from one (1) operational position 154a-154c to another either by using a direct mechanical linkage such as a cable or a pivoting handle or by electrical servos or solenoids. The valve spool 152 can also be equipped with a mechanical holding device such as centering springs or mechanical detents to preferentially position the valve spool 152 in any one (1) of the operational positions 154a-154c and operation of the vent 156.

Refer now primarily to FIG. 3 for an isolated view of the pedals 30a, 30b and their associated components. The pedal 30a, 30b are pivotally attached on opposite sides of the frame 22. The pedals 30a, 30b each have pedal arms 32 that pivot on pedal arm pivots 34. The pedals 30a, 30b also each have footpads 38 at their distal ends. The footpad 38 may be equipped with a cage-like device for encircling a user's foot to enable an upward force to be placed on the pedal arm 32. At the lower part of the frame 22 between the down tube and the wheel frame is a lower beam 28. The lower beam 28 has a centrally located annular pedal return pivot 42 having a pedal return link 40. The pedal return link 40 has an arcuate first finger 44a projecting from a first side and a similarly shaped second finger 44b projecting from an opposite side. The pedal return link 40 returns a depressed pedal arm 32 to a full upright position when the other pedal arm 32 is pushed down.

In use, a downward force exerted by a user on the footpad 38 of the first pedal 30a causes the pedal arm 32 to rotate about the pedal arm pivot 34. This results in actuation of the first pump 50a. Simultaneously, that pedal arm 32 depresses the first finger 44a, thereby causing the pedal return link 40 to rotate on the pedal return pivot 42. This causes the subsequent elevation of the second finger 44b against the pedal arm 32 of the second pedal 30b. This forces the pedal arm 32 to raise the second pedal 30b. Conversely, depression of the second pedal 30b results in a returning the first pedal 30a upward.

Figure 5A:
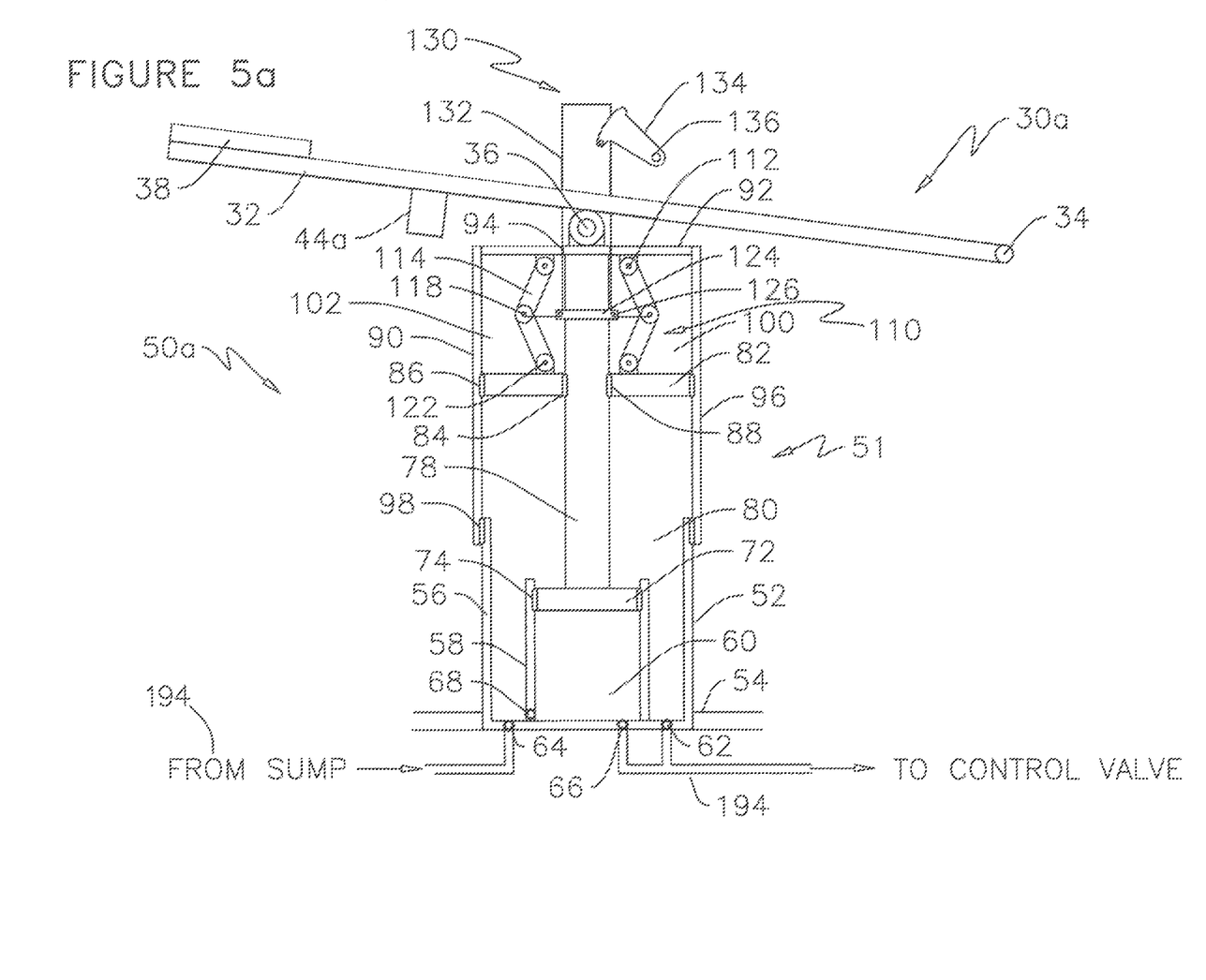
FIG. 5a is cross-sectional view taken along section line B-B of FIG. 3 showing a first pump 50a of the hydraulically-powered bicycle 10 expanded for an influx of oil 200 from a sump 190.
Figure 5B:
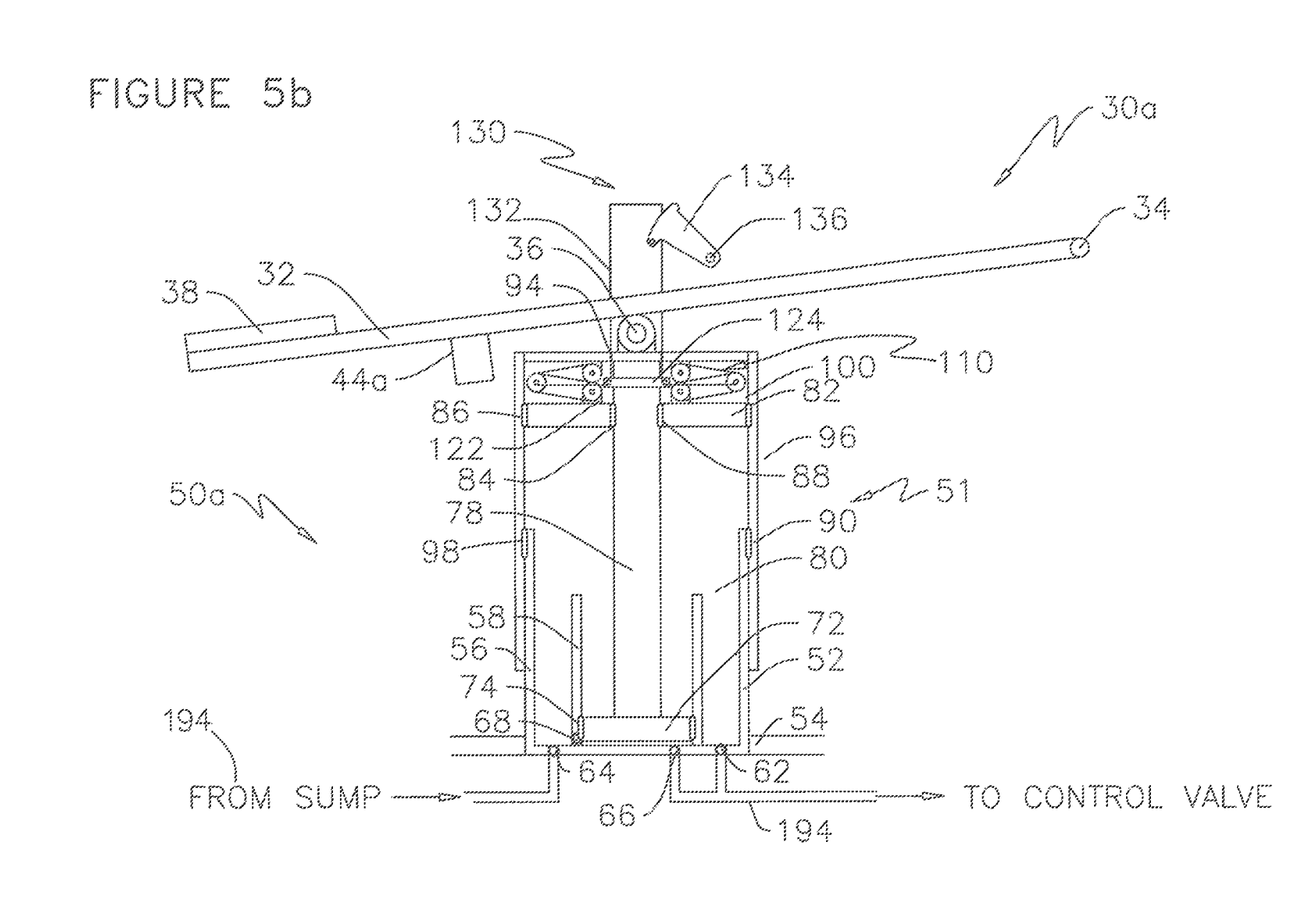
FIG. 5b is cross-sectional view of the first pump 50a while being compressed so as to force oil 200 to flow into a control valve 150.
Figure 5C:
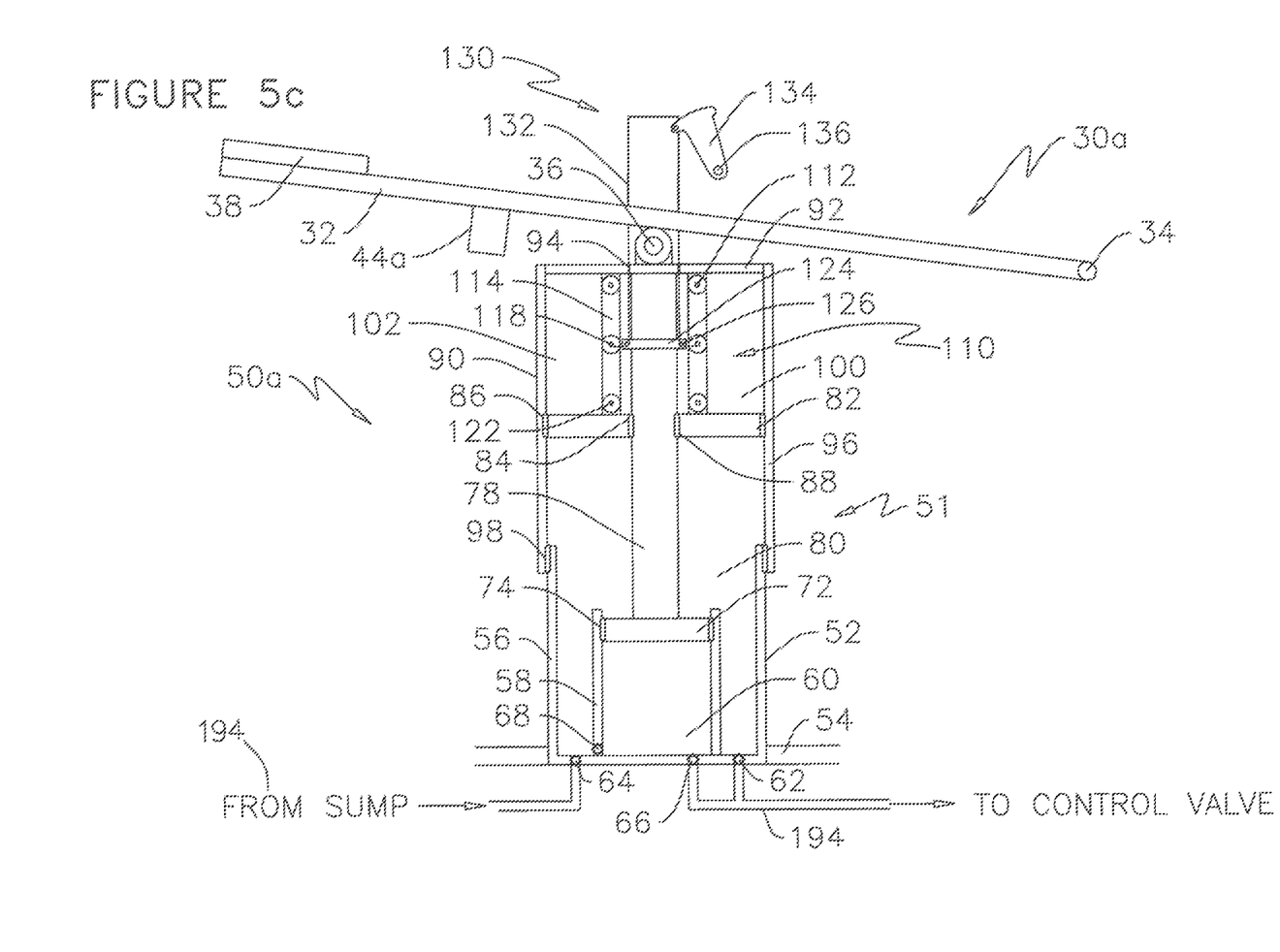
FIG. 5c is cross-sectional view of the first pump 50a depicting a locked lock linkage 110; and, FIG. 5d is a cross-sectional view of the first pump 50a depicting the lock linkage 110 engaged to force additional oil 200 to flow into the control valve 150.
Figure 5D:
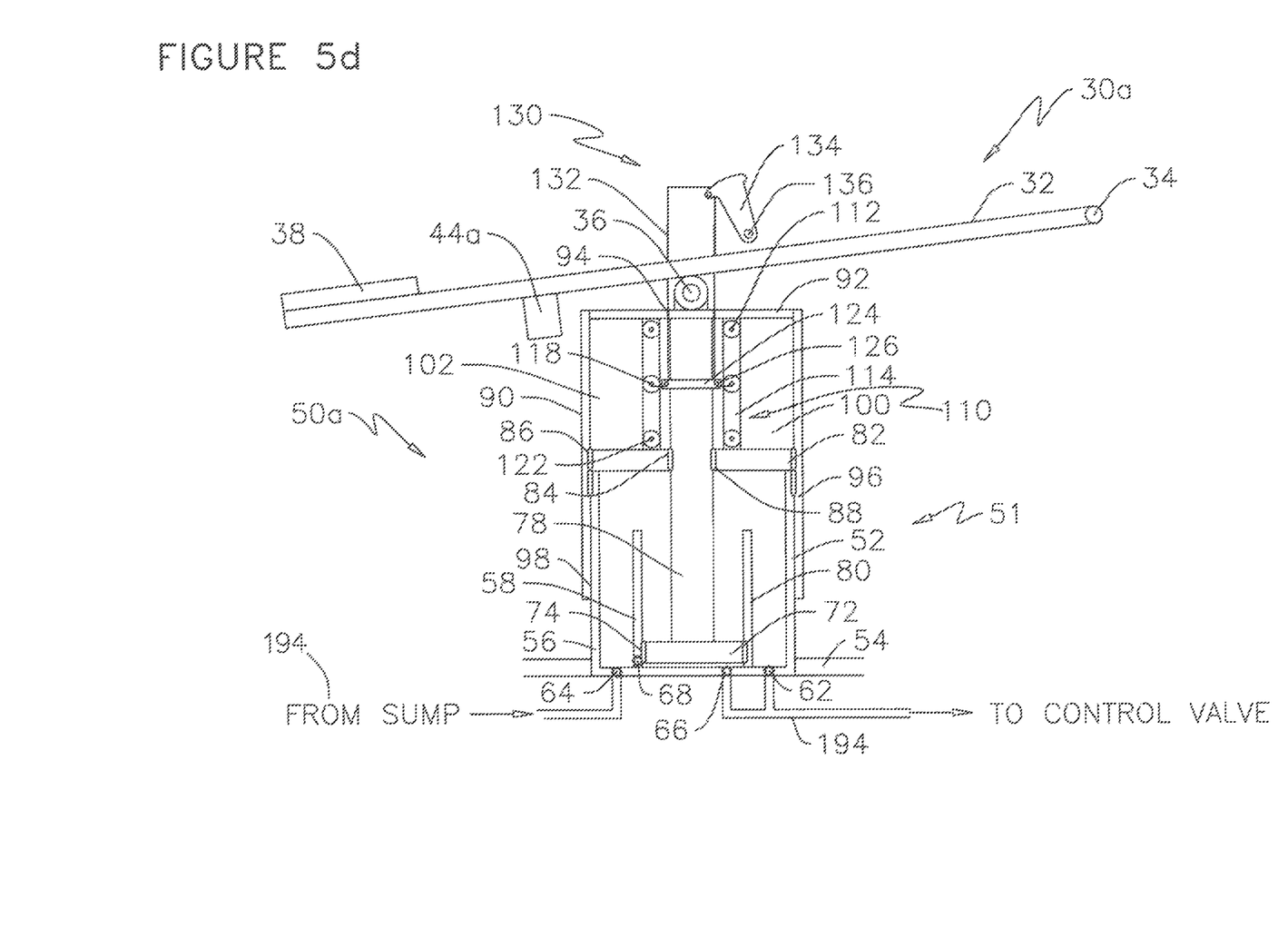

FIG. 5a presents a cross-sectional view taken along line B-B of FIG. 3 with the first pump 50a when expanded. FIG. 5b presents a cross-sectional view of the first pump 50a of the hydraulically powered bicycle 10 when collapsed. FIG. 5c presents a cross-sectional view of the first pump 50a with a lock linkage 110 locked. FIG. 5d presents a cross-sectional view of the first pump 50a with the lock linkage 110 engaged to force additional oil 200 into the control valve. While the specific illustrations of FIGS. 5a through 5d concern the first pump 50a it should be understood that the second pump 50b is the same as the first pump 50a. Consequently the following explanation of the first pump 50a is also applicable to the second pump 50b.

As shown in FIGS. 5a, the first pump 50a is a dual piston pump having a two-part housing 51. The housing 51 includes a movable pump segment 90 that operates along the longitudinal axis of a fixed pump segment 52. The fixed pump segment 52 has a planar base 54 and an encircling fixed wall 56 that are joined along their abutting edges to form an interior second piston chamber 80. The first pump 50a is fixed to a lower part of the frame 22.

Passing through the base 54 are hydraulic fittings that control the flow of oil 200 into and out of the pump 50a. A first outflow check valve 64 is situated between the piping 194 that runs between the sump 190 and the second piston chamber 80. The outflow check valve 64 blocks oil 200 from exiting the second piston chamber 80 while permitting an easy flow of oil 200 into the second piston chamber 80. An inflow check valve 62 is inserted into the piping 194 that runs between the second piston chamber 80 and the control valve 150. The inflow check valve 62 blocks oil 200 from entering the second piston chamber 80 while permitting an essentially free flow from the second piston chamber 80.

Disposed within the second piston chamber 80 and attached to the base 54 is a centrally located chamber wall 58. The chamber wall 58 forms the lateral boundary of a cylindrical first piston chamber 60. Disposed within the chamber wall 58 is a second outflow check valve 68. The outflow check valve 68 blocks oil 200 from leaving the first piston chamber 60 while enabling essentially a free flow into the first piston chamber 60. Disposed in the base 54 is a second inflow check valve 66 that is connected to the hydraulic piping 194 that runs to the control valve 150. The second inflow check valve 66 blocks oil 200 from entering the first piston chamber 60 while permitting an essentially free flow of oil 200 out of the first piston chamber 60.

The moveable pump segment 90 has a planar top plate 92 that connects to an encircling moveable wall 96 to form an internal third chamber 100. The moveable pump segment 90 is attached to the pedal arm 32 of a pedal 30a (or 30b) via a pump actuation link 36 (also see FIG. 3). The pump actuation link 36 is designed to minimize axial misalignment between the moveable pump segment 90 and the fixed pump segment 52. The moveable pump segment 90 fits over the fixed pump segment 52. A wall seal 98 is disposed between the fixed wall 56 and the moveable wall 96 to provide a hydraulic seal. The wall seal 98 is preferably an annular ring constructed of polymer and is seated in an annular seat that is formed into the fixed wall 56.

A cylindrical rod 78 connects the end plate 92 to a first piston 72 that moves within the first piston chamber 60. The cylindrical rod 78 slides through a second piston aperture 84 of a second piston 82. The housing 51, the pistons 72, 82, the second piston chamber 80, and the rod 78 are all constructed of such material that can withstand the total forces exerted with the hydraulically powered bicycle 10.

The first piston 72 maintains fluid communication with the first piston chamber 60 while the second piston 82 maintains fluid communication with the second piston chamber 80. The first piston chamber 60 is defined by the base 54 and the interior of the chamber wall 58. The top of the first piston chamber 60 is closed with a first piston seal 74. Oil 200 can only be drawn into the first piston chamber 60 through a second outflow check valve 68 and can only exit through the second inflow check valve 66. The second piston chamber 80 is defined by the first piston 72, the second piston 82 and the walls 56, 96. The second piston chamber 80 is closed by a second piston seal 86 and by a rod seal 88. Oil 200 can only be drawn into the second piston chamber 80 through the first outflow check valve 64 and can only exit through the first inflow check valve 62. The first piston seal 74, the second piston seal 86, and the rod seal 88 are all annular rings of comprised of a polymer material and are seated in respective annular grooves. The seals 74, 86, and 88 restrict the by-pass of oil 200.

The third chamber 100 is defined by the second piston 82 and the top plate 92. The third chamber 100 forms a void 102 without oil 200. Within the void 102 is a lock linkage 110 that is attached to the second piston 82 and to an interior face of the top plate 92. The lock linkage 110 has a plurality of linkage arms 114 that are interconnected through end pivot 112, linkage pivot 118, and piston pivot 122. The lock linkage 110 selectively permits displacement of the second piston 82 relative end plate 92. Movement of the second piston 82 is enabled by freeing the linkage arms 114 to rotate about the pivots 112, 118, 122.

The movements of the linkage arms 114 are controlled by a cable gathering system 130 that is operated by a lock lever 134. Movement of the lock lever 134 is controlled by rotation about a lock lever pivot 136. Rotation causes a shift cable 132 to be pulled through a cable aperture 94 in the top plate 92 so as to either lock or free the linkage arms 114. When the linkage arms 114 are locked there is a rigid connection between the second piston 82 and the moveable pump segment 90 (best shown in FIGS. 5c and 5d). Locking the linkage arms 114 is actually performed by having the shift cable 132 routed through cable pivots 126 of a slide ring 124. The slide ring 124 moves along the rod 78 to compensate for lateral movement of the linkage pivots 118. Selective engagement of the lock linkage 110 by a user configures the first pump 50a (and the second pump 50b) to use the second piston 82 to pump oil 200 through the control valve 150.

FIG. 5a shows that as the first pedal 30a is raised such that the moveable pump segment 90 is displaced relative to the fixed pump segment 52. This moves the rod 78 and the first piston 72 up to expand the first piston chamber 60. This creates a partial vacuum. The partial vacuum causes an inflow of oil 200 from the sump 190 through the piping 194, through the first outflow check valve 64, into the second piston chamber 80, and then through the second outflow check valve 68 into the first piston chamber 60. The influx of oil 200 into the first piston chamber 60 continues through the entire upward displacement of the moveable pump segment 90. This is referred to as the first piston in-stroke. At the maximum height of the first pedal 30a the first piston chamber 60 is at peak oil volume. During the first piston in-stroke oil 200 from any other source is blocked from entering the first piston chamber 60 by the second inflow check valve 66.

Referring now to FIG. 5b, as the first pedal 30a is depressed the first piston 72 is forced toward the base 54 via the rod 78 and the mechanical connection of the pump actuation link 36, thus collapsing the first piston chamber 60. Oil 200 is then forced to flow out through the second inflow check valve 66 where it is directed by the piping 194 to the control valve 150. Oil 200 is forced from the first piston chamber 60 during the entire down stroke of the first piston 72. This is referred to herein as the first piston outstroke. During the first piston outstroke the oil 200 is blocked from flowing into the sump 190 by the second outflow check valve 68.

Referring back to FIG. 3, as the first pedal 30a is depressed to perform a first piston outstroke the second pedal 30b is raised to perform a first piston in-stroke in the second pump 50b. After completion of the first piston outstroke a user can depress the second pedal 30b to bring about a first piston outstroke in the second pump 50b. Continued alternating operation of the first pedal 30a and the second pump 50b circulates oil 200 and propels the hydraulically-powered bicycle 10.

Turning now to FIG. 5c, which shows the lock linkage 110 locked. That is, the shift cable 132 is pulled upward to force the linkage pivots inward. Thus as the first pedal 30a is raised the moveable pump segment 90 is displaced relative to the fixed pump segment 52. This moves the second piston 82 as well as the first piston 72 upward. This expands both the first piston chamber 60 and the second piston chamber 80. Expansion of the first piston chamber 60 and second piston chamber 80 creates a partial vacuum in both areas. This creates an inflow of oil 200 from the sump 190 through the piping 194, through the first outflow check valve 64 and into the second piston chamber 80, and through the second outflow check valve 68 and into the first chamber 60. This oil 200 influx continues during upward displacement of the moveable pump segment 90 is referred hereinafter as the pump in-stroke. At the maxim height of the first pedal 30a the first piston chamber 60 and the second piston chamber 80 are at their peak oil volumes. During the pump in-stroke oil 200 from any other source is blocked by the second inflow check valve 66 and by the first inflow check valve 62.

Referring now to FIG. 5d, which also shows the lock linkage 110 locked, as the first pedal 30a is depressed the first piston 72 is forced toward the base 54 via the rod 78 while the second piston 82 is forced toward the base 54 by the lock linkage 110. This collapses both the first piston chamber 60 and the second piston chamber 80. Oil 200 is then forced out the first inflow check valve 62 and out the second inflow check valve 66 and into the piping 194 and thus into the control valve 150. Oil 200 continues to be forced from the piston chambers 60, 80 during downward displacement of the moveable pump segment 90. This is referred as the pump outstroke. During pump outstroke oil 200 is blocked from flowing into the sump 190 by the outflow check valves 64, 68. The combined flow of oil 200 from the first piston chamber 60 and from the second piston chamber 80 is greater than that possible using only the first piston chamber 60. The increased oil 200 flow translates to an increased speed of the motor 160. However, due to the increased area of the second piston 82 the output pressure during pump outstroke is less than that from the first piston outstroke due to spreading of applied forces over a larger area. Thus activation of the lock linkage 110 is somewhat akin to up-shifting a derailleur system in that speed is increased at the expense of increased force requirements.

The preferred embodiment of the present invention can be utilized by the common user in a simple and effortless manner with little or no training. The method of using the hydraulically powered bicycle 10 can be performing by acquiring a model of the hydraulically powered bicycle 10 having a desired style to suit a user; installing oil 200 into the sump 190; setting the cable gathering system 130 to release the lock linkage 110 so as to have the ability of moving the moveable pump segment 90 independently from the second piston 82; placing the valve spool 152 into the vent position 156; depressing the second pedal 30b to draw oil 200 into the first piston chamber 80; placing the valve spool 152 of the control valve 150 into the first operational position 154a; hydraulically powered bicycle 10; depressing the first pedal 30a to compress oil 200 in the first piston chamber 60, thereby forcing that oil 200 into the motor 160 through the control valve 150 to result in a forward propulsion while simultaneously causing the second pedal 30b to rise and draw oil 200 into the second pump 50b; depressing the second pedal 30b to compress the oil 200 in the second pump 50b thereby forcing that oil into the motor 160 through the control valve 150 to additional forward propulsion while causing the first pedal 30a to rise and draw oil into the first pump 50a; and continuing alternating depressions of the first pedal 30a and second pedal 30b. The user can selectively set the cable gathering system 130 to engage the lock linkage 110, thereby increasing the flow during a pump outstroke to increase the speed of the hydraulically-powered bicycle 10. During travel a user can change the control valve 150 to the second operational position 154b to enter a regenerative braking mode that charges the accumulator 170 with oil 200 for later use. With a charged accumulator 170 a user can avail themselves with of the potential energy in the accumulator 170 by moving the control valve 150 to the third operational position 154c.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A hydraulically-powered bicycle, comprising:
a frame;
handle bars;
a front tire;
a hydraulically powered drive wheel;
a hydraulic motor for driving said drive wheel;
a hydraulic sump for retaining oil;
a hydraulic control valve having at least a first operational position, a second operational position, and a third operational position;
a first hydraulic pump operated by a first pedal and operatively connected to said sump and to said control valve, said first hydraulic pump for pressurizing oil received from said sump;
a second hydraulic pump operated by a second pedal and operatively connected to said sump and to said control valve, said second hydraulic pump for pressurizing oil received from said sump; and, piping for directing pressurized oil from said control valve when said control valve is in said first operational position into said hydraulic motor;

wherein oil from said hydraulic motor directed back into said sump passes through said control valve as it flows into said sump.

2. The hydraulically-powered bicycle according to claim 1, wherein said piping further directs oil from said hydraulic motor back into said sump.

3. The hydraulically-powered bicycle according to claim 1, wherein said control valve includes an internal valve spool that directs the flow of oil within said control valve.

4. The hydraulically-powered bicycle according to claim 3, further including an accumulator for receiving and storing pressurized oil when said control valve is in said second operational position.

5. The hydraulically-powered bicycle according to claim 4, wherein said accumulator is comprised of a rigid vessel having an accumulator input port and a spring-biased diaphragm which divides the accumulator into an expandable compartment and a fill space.

6. The hydraulically-powered bicycle according to claim 5, wherein oil directed into the accumulator pushes the diaphragm against the spring which causes said expandable compartment to expand compressing the spring and to store energy in said compressed spring.

7. The hydraulically-powered bicycle according to claim 6, wherein said control valve continues to direct oil flow toward said motor when in said second operational position.

8. The hydraulically-powered bicycle according to claim 6, wherein energy stored in said compressed spring is released when said control valve is in said third operational position.

9. The hydraulically-powered bicycle according to claim 8, wherein energy stored in said compressed spring causes oil to pass through said control valve and toward said hydraulic motor.

10. The hydraulically-powered bicycle according to claim 9, wherein energy stored in said compressed spring increases the power output of said hydraulic motor.

11. The hydraulically-powered bicycle according to claim 1, wherein said first hydraulic pump has a first piston, a second piston, and a two part housing.

12. The hydraulically-powered bicycle according to claim 11, wherein said first hydraulic pump is configured to selectively couple said second piston to said first piston.

13. The hydraulically-powered bicycle according to claim 12, further including a lock-linkage to operatively couple said second piston to said first piston.

14. The hydraulically-powered bicycle according to claim 13, wherein said lock-linkage includes linkage arms interconnected at pivots.

15. A hydraulically-powered bicycle, comprising:
a frame;
handle bars;
a front tire;
a hydraulically powered drive wheel;
a hydraulic motor for driving said drive wheel;
a hydraulic sump for retaining oil;
a hydraulic control valve having at least a first operational position, a second operational position, and a third operational position;
a first hydraulic pump operated by a first pedal and operatively connected to said sump and to said control valve for pressurizing oil received from said sump, said first hydraulic pump including a first piston, a second piston, a two-part housing and a lock-linkage for selectively coupling said first piston to said second piston;
a second hydraulic pump operated by a second pedal and operatively connected to said sump and to said control valve, said second hydraulic pump for pressurizing oil received from said sump; and,
piping for directing pressurized oil from said control valve when said control valve is in said first operational position into said hydraulic motor.

16. The hydraulically-powered bicycle according to claim 15, wherein said lock-linkage includes linkage arms interconnected at pivots.

17. The hydraulically-powered bicycle according to claim 16, further including an accumulator for receiving and storing pressurized oil.

18. The hydraulically-powered bicycle according to claim 17, wherein said accumulator is comprised of a rigid vessel having an accumulator input port and a spring-biased diaphragm which divides the accumulator into an expandable compartment and a fill space.

* * * * *